United States Patent
Swedor et al.

(10) Patent No.: US 7,313,608 B1
(45) Date of Patent: Dec. 25, 2007

(54) METHOD AND APPARATUS FOR USING DOCUMENTS WRITTEN IN A MARKUP LANGUAGE TO ACCESS AND CONFIGURE NETWORK ELEMENTS

(75) Inventors: Olivier K. Swedor, Auvernier (CH); Tal I. Lavian, Sunnyvale, CA (US); Robert J. Duncan, San Francisco, CA (US)

(73) Assignee: Nortel Networks Limited (CA)

( * ) Notice: Subject to any disclaimer, the term of this patent is extended or adjusted under 35 U.S.C. 154(b) by 543 days.

(21) Appl. No.: 09/692,949

(22) Filed: Oct. 20, 2000

Related U.S. Application Data (60) Provisional application No. 60/212,979, filed on Jun. 21, 2000.

(51) Int. Cl.
 *G06F 15/177* (2006.01)
 *G06F 15/173* (2006.01)
(52) U.S. Cl. ...................... 709/221; 709/223
(58) Field of Classification Search ........ 709/223–224, 709/328, 220–222, 225, 226; 715/513
 See application file for complete search history.

(56) References Cited

U.S. PATENT DOCUMENTS

| | | | | |
|---|---|---|---|---|
| 5,541,911 | A * | 7/1996 | Nilakantan et al. | 370/422 |
| 5,835,727 | A * | 11/1998 | Wong et al. | 709/238 |
| 5,951,649 | A * | 9/1999 | Dobbins et al. | 709/238 |
| 6,269,398 | B1 * | 7/2001 | Leong et al. | 709/224 |
| 6,463,528 | B1 * | 10/2002 | Rajakarunanayake et al. | 713/1 |
| 6,529,515 | B1 * | 3/2003 | Raz et al. | 370/401 |
| 6,542,515 | B1 * | 4/2003 | Kumar et al. | 370/463 |
| 6,546,419 | B1 * | 4/2003 | Humpleman et al. | 709/223 |
| 6,757,720 | B1 * | 6/2004 | Weschler, Jr. | 709/220 |
| 2002/0032709 | A1 * | 3/2002 | Gessner | 707/540 |
| 2003/0014505 | A1 * | 1/2003 | Ramberg et al. | 709/223 |

OTHER PUBLICATIONS

Ajita et al., "XNAMI—An extensible SML-based paragigm for network and application management instrumentation," 1999, IEE International Conference on Networks, 1999, pp. 115-124 (shown as pp. 1-10).*

Jaeger et al., "Dynamic Classification in Silicon-based Forwarding Engine Environments," Nov. 1999, 10th IEEE Worksho on Local and Metropolitan Area Networks, 1999, pp. 103-109.*

(Continued)

*Primary Examiner*—Ario Etienne
*Assistant Examiner*—Sean Reilly
(74) *Attorney, Agent, or Firm*—McGuinness & Manaras LLP (57) ABSTRACT

An XML accessible network device is capable of performing functions in response to an XML encoded request transmitted over a network. It includes a network data transfer service, coupled to a network, that is capable of receiving XML encoded requests from a client also connected to the network. An XML engine is capable of understanding and parsing the XML encoded requests according to a corresponding DTD. The XML engine further instantiates a service using parameters provided in the XML encoded request and launches the service for execution on the network device. A set of device APIs interacts with hardware and software on the network device for executing the requested service on the network device. If necessary, a response is further collected from the device and provided to the client in a response message.

49 Claims, 4 Drawing Sheets

OTHER PUBLICATIONS

Pal et al., "XML and Quality Objects," Jun. 1999, IEEE 8th International Workshops on Enabling Technologies: Infrastructure f Collaborative Enterprises, 1999, pp. 315-316.*

Ajita et al., "A Java-Based SNMP Agent for Dynamic MIBs," Dec. 1999, Global Telecommunications Conference, 1999, vol. 1a, pp. 396-400.*

Business Editors et al., "New Management-specific XML Dialect From Manage.Com Helps On-line Businesses Control Infrastructure, Business Processes," Dec. 13, 1999, Business Wire, pp. 1ff.*

Mcconnell, "XML Can Tie App Data Better Than SNMP," Nov. 8, 1999, InternetWeek, Issue 788, pp. 21ff.*

Sahai et al., "Managing Next Generation E-Services," Sep. 21, 2000, Hewlett Packard Company, printed from www.hpl.hp.com/techreports/2000/HPL-2000-120.pdf.*

Jaeger et al., "An Active Network Services Architecture for Routers with Silicon-Based Forwarding Engines," printed from www.cs.umd.edu/~hollings/papers/lanman99.pdf, date unknown.*

Lavian, "Java-enabled Programmable Network Devices," May 4, 2000, printed from buffy.eecs.berkeley.edu/Seminars/2000/05.May/000504.lavian.html.*

Lavian, "Open Networking Better Networking Through Programmability," Aug. 2000, Nortel Networks, pp. 1-44, printed from www.cs.princeton.edu/nsg/workshop/tal.ppt.*

Duffy, "HP Intros Mgmt. Apps for Router Nets," Aug. 29, 1994, Network World, vol. 11, Iss. 35, p. 17.*

Salamone, "IP Mgm't Simplified by Lucent," Feb. 7, 2000, InternetWeek, Iss. 799, p. 21.*

Cover, The SGML/ML Web Page; Nov. 1999.*

Bryan; An Introduction to the Extensible Markup Language (XML); 1997.*

Henry; Net Management with XML; Sep. 1999.*

DMTF; Web-Based Enterprise Management (WBEM) Standars; Oct. 2000.*

* cited by examiner

METHOD AND APPARATUS FOR USING DOCUMENTS WRITTEN IN A MARKUP LANGUAGE TO ACCESS AND CONFIGURE NETWORK ELEMENTS

CROSS-REFERENCE TO RELATED APPLICATIONS

The present application is based on, and claims priority from U.S. Provisional Appln. No. 60/212,979, filed Jun. 21, 2000. The present application is also related to co-pending U.S. application Ser. No. 09/727,341 (NOR-12675HU), filed Nov. 29, 2000, and co-pending U.S. application Ser. No. 09/726,758 (NOR-12678HU), filed Nov. 29, 2000, both commonly owned by the assignee of the present application.

FIELD OF THE INVENTION

The present invention relates to network device configuration and monitoring, and more particularly, to a method and apparatus for accessing, configuring and controlling a device stationed on a network using documents written in a markup language such as XML.

BACKGROUND OF THE INVENTION

Computer networks continue to proliferate. As they do so, they become increasingly complex and difficult to manage. This problem is exacerbated when a variety of network devices, computers, and software are combined together to integrate large intranets with the Internet.

Figure 1:
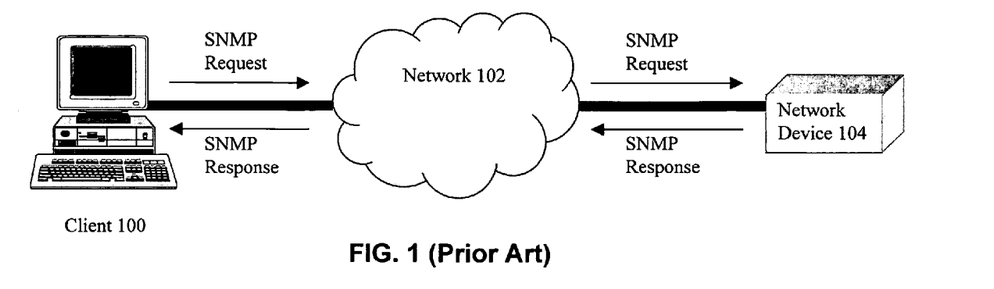
FIG. 1 illustrates a conventional architecture for accessing, configuring and controlling a network device using standard network protocols.

As shown in FIG. 1, when a client 100 wants to learn information regarding a remote network device 104 stationed on a network 102, code executing on client 100 formats a message requesting such information and sends it to the network device 104. Network device 104 must be preprogrammed with functionality for communicating in the protocol required by client 100's message and for knowing exactly how to get the information requested. If so, network device 104 can then respond with the requested information.

Simple network management protocol (SNMP) is one example of a network protocol that allows clients to learn information about remote network devices. SNMP allows network devices 104 to send alerts to a manager 102, or to send statistical information about traffic, but it limits the kind of information that can be sent to that which is pre-defined in the management information blocks (MIBs) coded into the network device. Accordingly, a new MIB needs to be redefined each time a new type of information is maintained or is needed about the device, thus making network management and performance even more problematic.

SUMMARY OF THE INVENTION

The present invention relates to an apparatus and method for more efficiently accessing, configuring and controlling a network device using documents written in a markup language such as the Extensible Markup Language (XML).

In accordance with one aspect of the invention, an XML accessible network device is capable of performing functions in response to an XML encoded request transmitted over a network. It includes a network data transfer service, coupled to a network, that is capable of receiving XML encoded requests from a client also connected to the network. An XML engine is capable of understanding and parsing the XML encoded requests according to a corresponding document type definition (DTD). The XML engine further instantiates a service using parameters provided in the XML encoded request and launches the service for execution on the network device. A set of device APIs interacts with hardware and software on the network device for executing the requested service on the network device. If necessary or desired, a response is further collected from the device and provided to the client in a response message.

In accordance with another aspect of the invention, a method for causing a network device to locally perform a service comprises the steps of receiving at the network device a document written in accordance with a markup language and a corresponding document definition, parsing by the network device the received document in accordance with the corresponding document definition, and executing the service on the network device in accordance with the parsed document.

In accordance with another aspect of the invention, a network device for locally performing a service in response to a remote request comprises means for receiving at the network device a document written in accordance with a markup language and a corresponding document definition, means for parsing by the network device the received document in accordance with the corresponding document definition, and means for executing the service on the network device in accordance with the parsed document.

In accordance with another aspect of the invention, a network device for locally performing a service in accordance with a received document written in a document markup language comprises a parser that is adapted to parse the received document in accordance with a document definition to obtain an identifier of the service and a service launcher that is adapted to launch the service corresponding to the identifier parsed from the received document.

BRIEF DESCRIPTION OF THE DRAWINGS

The foregoing and other features, aspects, and advantages of the present invention will become more apparent from the following detailed description when read in conjunction with the following drawings, wherein.

DETAILED DESCRIPTION OF THE PREFERRED EMBODIMENTS

The present invention will now be described in detail with reference to the accompanying drawings, which are provided as illustrative examples of preferred embodiments of the present invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 2:
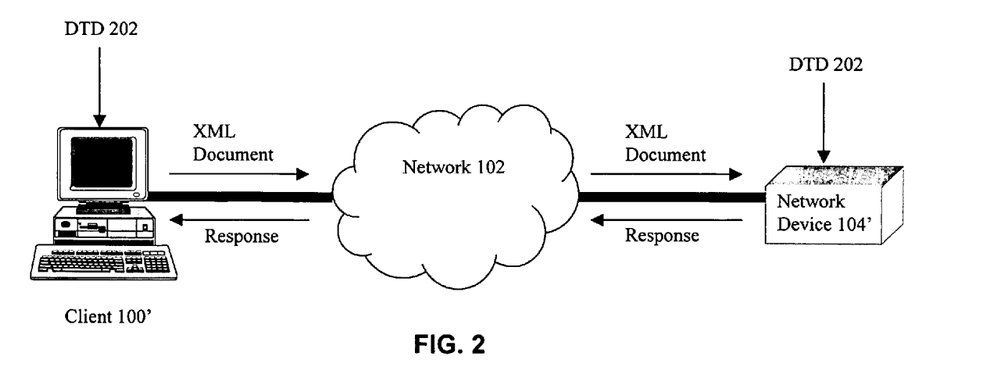
FIG. 2 is a functional overview of an apparatus for accessing, configuring and controlling a network device using XML encoded data in accordance with the present invention.

FIG. 2 is a functional overview of one embodiment of the present invention. As shown, a client 100' is connected in the conventional manner to a network such as the Internet or an intranet (i.e. LAN/WAN/MAN) 102, which in turn is connected to a network device 104' (e.g. router, switch, hub or similar device capable of processing fixed-length or variable-length packets in a network). It should be noted that although the features and advantages of the present invention are particularly well suited to routers, switches and hubs, and will be described in more detail below with reference to such devices, other network-aware devices can be adapted for use in the present invention, and so the invention is not to be limited to these particular illustrative devices. For example, network device 104' may also include gateways, multiplexers and other known or future equivalents, including those having a packet forwarding architecture.

As is apparent from FIG. 2, in contrast with the prior art, the present invention provides communications for accessing and configuring network elements using XML documents. As is known, XML is a metalanguage built upon the Standard Generalized Markup Language (SGML), and is a tool for defining text markup languages, defined by the World Wide Web Consortium (W3C). An XML-defined language comprises a set of tags, attributes, and constraints on how to use them. XML is a simple, open, portable, extensible means of representing data. Unlike HTML, XML tags tell what the data means, instead of just how to display it. Further information regarding XML can be found from the W3C web pages at http://www.w3.org/XML.

Those skilled in the art, after being taught by the present disclosure, will appreciate that there are many flavors of XML and SGML and that many markup languages are equivalent to XML for adaptation and implementation according to the present invention. XML is described in detail in this application because of its wide acceptance and adoption. However, equivalents to XML that are within the scope of the invention can include, for example, XSL, XSLT, XPath, XLink, XPointer, HyTime, DSSSL, CSS, SPDL, CGM, ISO-HTML, and others.

As is further known, the format of an XML document is defined by a Document Type Definition (DTD). Accordingly, the present invention includes local copies of DTD 202 at the sending and receiving ends of the XML document. There can be just one DTD 202 that defines all communications for all applications, or there may be different DTDs 202 for different types of applications, and those skilled in the art will understand the possible variations. Further, there are many ways known in the art that such local copies of DTD 202 can be retrieved and obtained by network device 104', and the details thereof will not be presented so as not to obscure the invention.

Generally, when the client computer 100' wants to access or configure network device 104' (i.e., cause network device 104' to perform a service locally on the network device 104'), it creates an XML request encoded in the format defined by DTD 202 but with parameters specific to the desired access or configuration. Client 100' sends the document over the network 102, which document is received by the network device 104' in the form of data packets as is conventionally done. In contrast to the conventional network device 104, the network device 104' has been adapted to include functionality necessary to decode the XML encoded request and to perform tasks necessary to complete the request, including, if required, interacting with the hardware and software of the device to perform a service locally on the network device 104'. If further needed or desired by the client computer, network device 104' may create and format a response to client computer 100', which may or may not also be an XML encoded document.

Figure 3:
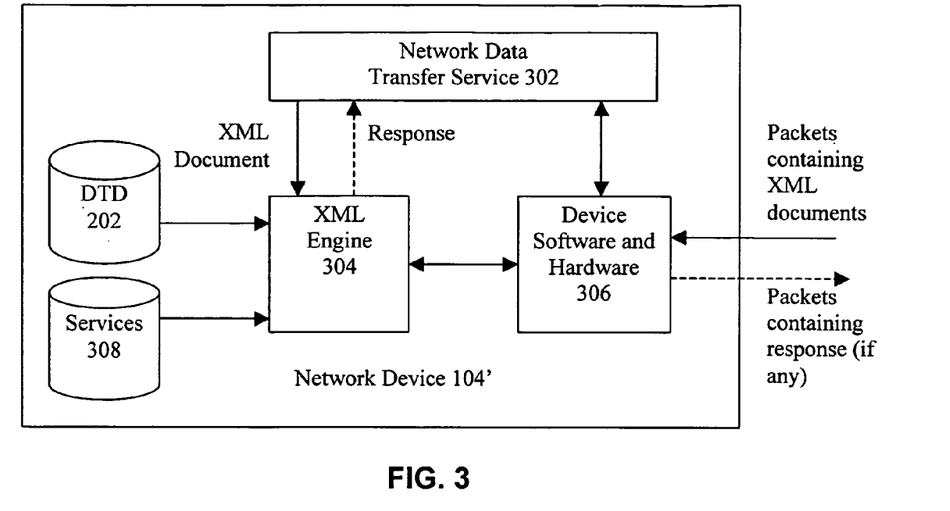
FIG. 3 further illustrates an example of a network device that is configured in accordance with the present invention.

FIG. 3 illustrates a network device 104' in accordance with the present invention in further detail. As shown in FIG. 3, network device 104' comprises, in part, a network data transfer service 302, an XML engine 304 that accesses local copies of DTD 202 and stored services 308, and device software and hardware 306. It should be apparent that network device 104' can contain or include other components for performing conventional switching and routing functions, for example. However, the details of such additional components are not presented here so as not to obscure the present invention. Further, although DTD 202 and stored services 308 are shown as local storages, it should be apparent that such storage need not be permanent. For example, DTDs and services may be retrieved from a remote server via a URL, and just a temporary representation can be resident on device 104' as needed by XML engine 304 according to techniques well understood by those of skill in the art.

Device hardware and software 306 represents conventional switch or router functionality that has been adapted for use in the present invention. In one possible implementation, where network device 104' is an Accelar/Passport family router switch from Nortel Networks, device hardware and software 306 includes an ASIC-based forwarding architecture, with switch ASICs comprising most of the device's switch fabric and handling most forwarding tasks among switch ports in accordance with resident forwarding rules. For such a device 104', device hardware and software 306 further includes a CPU and associated memory coupled to the switch fabric that runs the VxWorks real-time OS, and existing applications stored in memory and executed by the CPU that run as VxWorks "tasks" for monitoring and controlling and configuring the ASIC forwarding hardware via a switch-specific API. It should be apparent that other types of switches and routers may be used in accordance with the invention, and that other operating systems such as Linux, PSOS, Vertex and RMX may comprise the device's operating system.

Services stored in database 308 preferably include applications that enhance the network management capabilities of the device 104' above and beyond that which is possible with a conventional network device 104. Such applications may include means for setting and reporting system variables that are not limited by pre-configured MIBs. Such applications may further include means for configuring the forwarding architecture so as to enable the device to filter network traffic containing packets generated from activities not essential to a company's business, such as browsing the Internet. Other examples of services can include event loggers and monitors, means for establishing different levels of quality of service in packet forwarding decisions, and the like.

In one example of the invention, device hardware and software 306 also includes an Oplet Runtime Environment (ORE™, a trademark of Nortel Networks), which is a platform for secure downloading, installation, and safe execution of services on a network device such as a switch or router, the downloaded services (i.e. Oplets) being locally stored in services database 308. In such an example of the invention, the network data transfer service 302 and XML engine 304 may actually be implemented as one or more services (i.e. Oplets) managed by the ORE™. The ORE™ is described in more detail in other publications, including publications posted at the website www.openetlab.org, and so will not be described in detail here so as not to obscure the invention. Although use of the invention in network devices equipped with an ORE™ is considered one preferred implementation, the invention is not so limited. Further, the functionalities provided by the ORE™ that are useful for the present invention will be apparent to those skilled in the art after being taught by the present specification and can be separately provided.

Network data transfer service 302 is, for example, an HTTP server such as one provided by Apache. This is because, in one example of the invention, the XML encoded requests and device responses (if any) are exchanged using the HTTP protocol. As is known, HTTP is an application-level protocol that is generic, stateless, and can be used for many tasks other than transferring hypertext, which is its most widely known use. In one example of the invention, the HTTP communications take place over TCP/IP connections. The most widely used HTTP methods for handling communications are GET, HEAD and POST. The XML engine 304 is registered with the HTTP server (by port number, for example) so that when XML encoded requests according to the invention are received by service 302, XML engine 304 can be activated and provided with the XML encoded request. HTTP server keeps handles for all received requests pointing to the requesting client's address (perhaps with a timeout), and when responses from XML engine 304 are received along with the handle, HTTP server provides the response back to the requesting client using HTTP methods.

It should be apparent that other techniques for sending XML files through the HTTP protocol could be used. Moreover, in another alternative of the invention, responses may be forwarded back to the requesting client in various presentation alternatives such as providing HTML pages for browser access.

Device hardware and software 306 is adapted in accordance with the invention to forward packets using the HTTP protocol and addressed to network device 104' to the network data transfer service 302, if an HTTP server is not already provided in the device. This can be done in many ways known to those skilled in the art, and may depend on the particular packet forwarding architecture of the device. For example, where packets addressed to the device are automatically forwarded to the device's CPU, the device's kernel packet handling need only be aware of, and be able to communicate packets with, the HTTP server.

XML engine 304 is generally responsible for receiving XML encoded documents, for causing the device 104' to perform the requested service and, if appropriate, obtaining and formatting a response to the requesting client.

Figure 4:
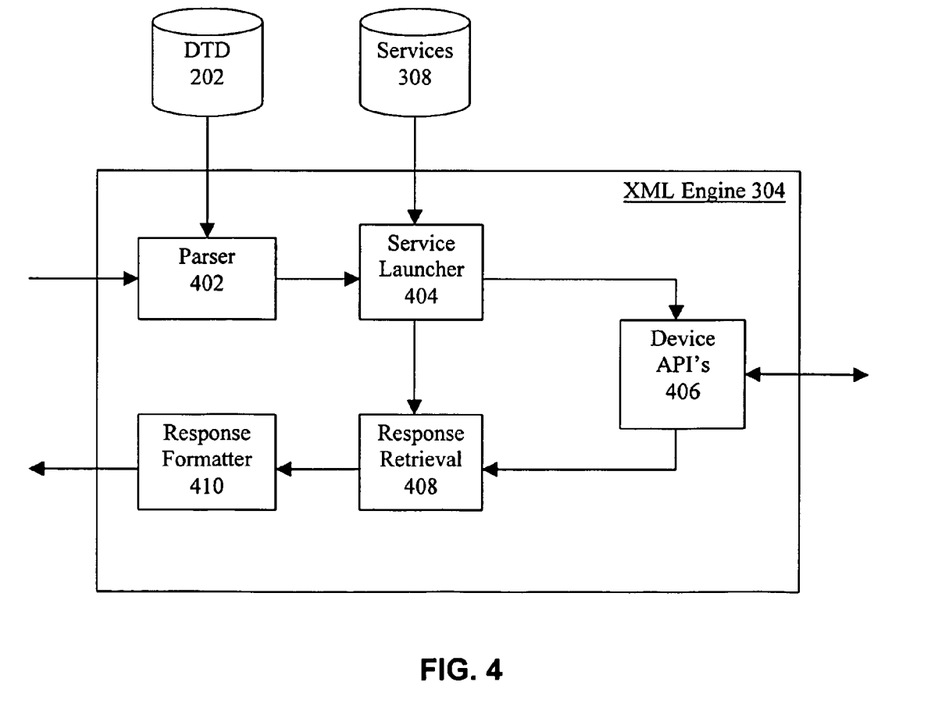
FIG. 4 further illustrates an XML engine that can be included in a network device according to the invention such as that illustrated in FIG. 3.

XML engine 304 is further illustrated in FIG. 4. As shown, it includes a parser 402, a service launcher 404, device APIs 406, response retrieval 408 and response formatter 410. Although shown separately for clarity of the invention, the different blocks shown in FIG. 4 can be implemented in various combinations either together or separately. Moreover, some or all of the functionalities may be partially or fully included as functionalities of the ORE™ in the example of the invention where the ORE™ is included in the network device 104'.

Parser 402 receives the XML document from the network data transfer service 302 (preferably along with a handle for the individual request), and retrieves the necessary DTD based on the required identifier in the XML document. Using the appropriate DTD, parser 402 performs processing based on the XML tags defined in the DTD and extracts out the values for each included in the XML document. These parsed-out values are provided to the service launcher 404. There are several different conventionally available XML parsers that can be used to implement parser 402, such as Document Object Model (DOM), Simple API for XML (SAX) and Java Document Object Model (JDOM).

At a minimum, the DTD and the XML document should at least specify one of the services 308 to be performed. For example, the DTD may include a definition such as:

<!ELEMENT service>
<!ATTLIST service
   class CDATA #IMPLIED
   source CDATA #IMPLIED
   id ID #IMPLIED>

This allows an XML document to specify a "service" having "class," "source" and "id" parameters. Accordingly, a client wishing to launch a service on a remote device would create an XML document specifying a "service" with at least a desired "class." Such a corresponding XML document may include the following text (as well as an identifier of the DTD that defines its structure):

<service class="Address" id="ID_2">
</service>

This XML document requests the network device 104' to launch a "service" having a class of "Address." Accordingly, in this example of the invention, when the network device 104' receives the XML document, parser 402 will retrieve the DTD indicated by the identifier in the document. Using this DTD, it will understand that a "service" having a class of "Address" should be launched. Accordingly, it will send a message to service launcher 404 to launch a service defined by the class "Address," which can, for example, cause the physical address of the device to be set or reported.

If the service includes any runtime parameters, the DTD and XML documents should specify those as well, although the service should be able to execute using default parameters. Depending on the service requested, there may or may not be a requested response to be sent back to the client. For example, one requested service may be to provide traffic statistics of the device, for which a response would be collected from the device hardware and software and returned to the client. Meanwhile, another requested service may be to adjust priorities of certain traffic flows, for which a response from the device hardware and software would not necessarily be requested. As an example of a requested service with runtime parameters, a requested service may be to report on device throughput, collected a variable number of seconds apart, with the report repeatedly provided back to the client once per variable number of minutes.

Using the above example of the service of class "Address," the DTD may further include a definition such as:

```
<!ELEMENT property (value | null)*>
<!ATTLIST property
    name CDATA #REQUIRED>
<!ELEMENT value (#PCDATA)*>
<!ATTLIST value
    class   CDATA #IMPLIED
    id      ID #IMPLIED
    source  IDREF #IMPLIED>
```

This allows a "property" with a "name" to be assigned a "value." A corresponding XML document may then be created by the requesting client that contains the following text:

```
<property name = "city">
    <value id="ID_3">San Francisco</value>
</property>
<property name = "country">
    <value id="ID_4">USA</value>
</property>
```

When these definitions and this text are combined with the previously-described XML-encoded request, the combined XML text could, for example, cause a service of class "Address" to set a city field and a country field in the device address system variables to San Francisco and USA, respectively.

Service launcher 404 receives, at a minimum, an identifier of the requested service to be executed by the device, as encoded in the XML document and parsed by parser 402. Service launcher 404 then retrieves the requested service from services storage 308 and instantiates a version of the service with any parameters also provided in the XML document and parsed out by parser 402.

According to an aspect of the invention, all services do not continually run on the device 104'. Rather, individual services are launched as requested by clients so as to perform functionality when needed. Accordingly, service launcher 404 provides the mechanism for causing a service to be executed on device 104' when it is requested.

According to a further aspect of the invention, services are designed to be generic so that E they may be executed on various different devices and with the capability of being particularized for a specific circumstance. For example, using the illustration above, the "Address" class service can be used on any device with system variables for device location, and can accept any string for insertion into the city and country fields.

In one example of the invention discussed above, services are encapsulated in Oplets and downloaded, installed and managed by the ORE™. However, the present invention is not limited to this example. As another alternative, services may be methods that operate on objects designed in any object-oriented programming language such as C++, Java, etc. Such methods can then be instantiated with the parameters provided in the XML document and compiled into an executable file by service launcher 404, which executable file can then be executed as a task on the device CPU under a device operating system such as VxWorks. It should be further apparent that the invention is not limited to object-oriented programming languages, and those skilled in the art will understand how to implement the present invention using other non-object-oriented programming languages such as C, PERL and CORBA.

Device APIs 406 includes functionality to interact with device hardware and software 306 to perform the requested service and to receive any responses from the device's device hardware and software. For example, where a service requests a network parameter of the device such as the device's name, the device APIs 406 will interact with the device hardware and software to retrieve the name (e.g. a string) from the device's system variables (e.g. MIB) and provide it to response retrieval 408, along with an identifier of the service that requested the parameter.

It should be appreciated that the actual implementation of device APIs 406 depends on the code used to implement services 308, as well as the device hardware and software. In one example of the invention, all services 308 use a common code language such as C/C++. In such an example, device APIs 406 comprises APIs that provide a common interface for all such services to the existing code running on the device 104'. Accordingly, services 308 can be designed to execute on various platforms, with a known set of APIs providing a common interface to the services, while providing a variable interface with the existing code, depending on the device. The design and implementation of such APIs are within the skill of those in the art given the existing code, the device operating system and the design of services 308.

In another example, device APIs 406 communicate with existing conventional applications of network device 104 through a loopback address of the device. For example, the service requested by the received XML document may request access to network parameters of the device. Specifically, the requested service launched by the XML engine can access the network parameters of the device by specifying the loopback address, which can then access the parameters through a network protocol stack such as an SNMP stack.

It should be apparent that the above two examples are not necessarily mutually exclusive. Further, other example implementations of device APIs 406 are possible.

Response retrieval 408 keeps track of the services that require responses from the device hardware and software and initiates response messages to the requesting client when responses are received. It receives from service launcher 404 identifiers of the services that have been a launched, as well as handles to the XML encoded request that caused the service to be launched. When responses are received from device APIs 406, they are preferably received along with the identifier of the service. Response retrieval 408 can then correlate the response to the XML encoded request to whom the response belongs and forward the response to response formatter 410 along with the handle to the XML encoded request.

Response formatter 410 formats response messages to be sent back to the requesting client. It receives from response retrieval 408 a response along with an identifier of the XML encoded request, formats a response message for transmission back to the requesting client, and forwards the response message to the network data transfer service 302. Network data transfer service 302 can then send the message back to the requesting client by using the handle of the XML encoded request to retrieve the header information contained in the packets carrying the XML encoded request. In one example of the invention, responses are also XML encoded documents that will instantiate a response object on the client. In this example, response formatter 410 may also access DTDs such as DTD 202 for formatting a response.

However, it should be apparent that many other variations of formatting a response other than using XML documents are possible.

It should be further apparent that there are many possible ways of implementing response retrieval 408 and response formatter 410, and that they may be omitted altogether. For example, response retrieval 408 and/or response formatter 410 may be partially or fully implemented by #either or both of services 308 and device APIs 406.

Figure 5:
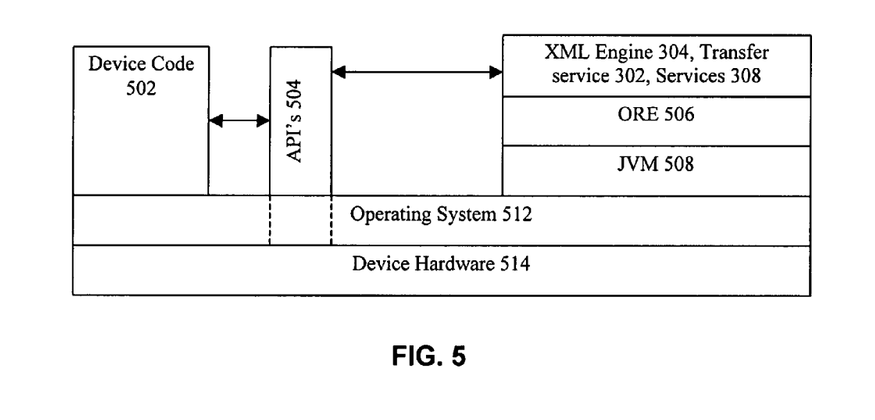
FIG. 5 is an architectural view of a network device that is configured in accordance with the present invention.

FIG. 5 is an architectural view of an example of network device 104' in accordance with the principles of the present invention.

As shown in this example, interaction with the device hardware 514 (e.g. switch fabric, ports, memory, etc.) is performed through the device operating system 512 (e.g. VxWorks). The device code (e.g. routing software, etc.) 502 interacts with the device operating system 512. Application programming interfaces (API's) 504 (e.g. Java, C/C++, etc.) interact directly with the device hardware 514 and/or via device operating system 512. API's 504 may further interact with device hardware and operating system through device drivers (not shown). Java Virtual Machine (JVM) 508 preferably includes all functionality provided by a conventional JVM and is ported to the device 104' and operating system 512. Oplet Runtime Environment™ (ORE) 506 interacts with the JVM to coordinate the downloading, management and execution of services 308. XML engine 304 and services 308 interact with ORE 506 for execution. XML engine 304 and services 308, and transfer service 302, during operation, may also interact with API's 504, which further interact with device code 502.

Figure 6:
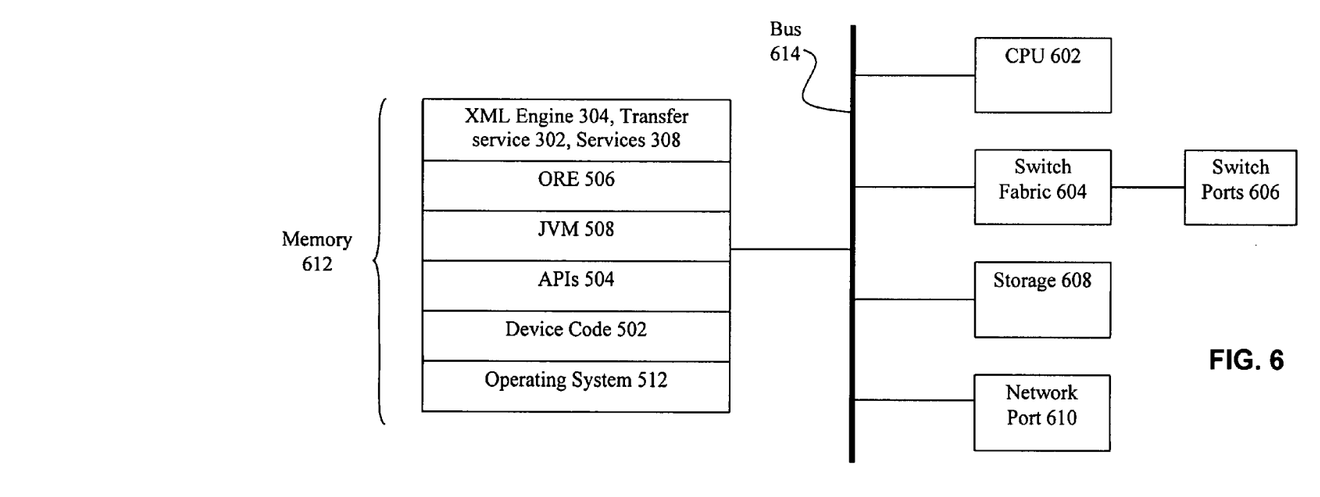
FIG. 6 is an example implementation of a network device in accordance with the invention and the architecture depicted in FIG. 5.

FIG. 6 illustrates an example implementation of a network device 104' having the architecture illustrated in FIG. 5.

As shown, network device 104' includes a CPU 602, switch fabric 604, storage 608, network port 610 and memory 612 all communicating via a bus 614. Switch fabric 604 further communicates with switch ports 606. Storage 608 can comprise memory for storing program and device data. Network port 610 can provide a loopback address for access by services and other network management applications as described above. Memory 612 includes code for execution by CPU 602.

It should be apparent that components corresponding to CPU 602, switch fabric 604, switch ports 606, storage 608, network port 610, memory 612 and bus 614 are also provided in a conventional network device 104. Accordingly, as should be further apparent from FIG. 6, adapting a conventional network device 104 in accordance with the invention merely requires updating memory 612 to include executable software corresponding to the above-described functionality of the invention.

Figure 7:
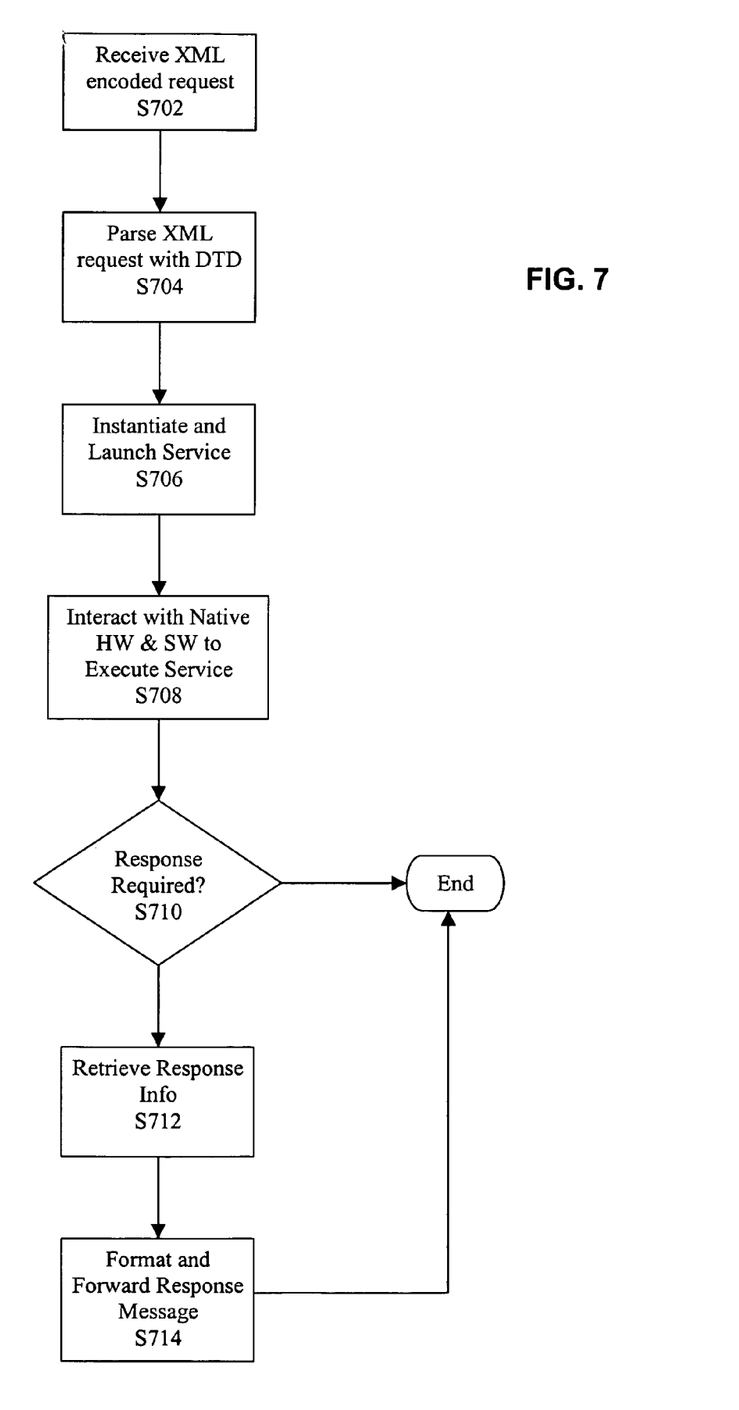
FIG. 7 illustrates a process for accessing, configuring and controlling a network device using XML encoded data in accordance with the present invention.

FIG. 7 illustrates an example of a process by which an XML encoded request received by the network device 104' is fulfilled in accordance with the present invention.

As shown in FIG. 7, when interaction with the network device 104' is desired, the client computer 100' encodes the request by constructing an XML encoded document corresponding to the request and in accordance with a corresponding DTD. This XML document is sent across the network 102 using a standard network protocol such as HTTP and received by network device 104' (block S702). The XML document is received by the network data transfer service 302 running on the network device 104' and provided to the XML engine 304. The XML engine 304 parses the XML document using the corresponding DTD identified in the document (block S704). The parsed document corresponds to one of the stored services 308, which is then instantiated with the parameters included in the parsed document. The instantiated service is then launched for execution on the device 104' (block S706). The requested service may require interaction with the device software and hardware for execution, as indicated in block S708. If a response message back to the requesting client 100' is required by the service (determined in block S710), the response from the device hardware and/or software is retrieved (block S712), and a response message is formatted and forwarded to network data transfer service 302 for transmission back to client 100' (block S714).

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method for controlling a data forwarding service in a network device comprising a data forwarding device, comprising the steps of:
   receiving at the network device a document written in accordance with a markup language and a corresponding document definition, wherein the document describes the data forwarding service by specifying a class of objects for the data forwarding service;
   parsing by the network device the received document in accordance with the corresponding document definition, wherein the parsing determines at least one parameter describing the data forwarding service; and
   executing the data forwarding service on the network device upon completion of the parsing, in accordance with the parsed document, wherein the executing includes instantiating and launching the data forwarding service in the data forwarding device based on the class of objects for the data forwarding service, and wherein the data forwarding service configures a forwarding architecture in the network device operable to filter network traffic.

2. A method according to claim 1, wherein the step of executing includes the step of interfacing with hardware and software on the network device.

3. A method according to claim 1, wherein the markup language is XML.

4. A method according to claim 3, wherein the corresponding document definition is an XML DTD.

5. A method according to claim 1, further comprising:
   retrieving the corresponding definition from a plurality of document definitions in accordance with an identifier in the received document.

6. A method according to claim 5, wherein the plurality of document definitions are provided in a local storage of the network device.

7. A method according to claim 3, further comprising the step of:
   retrieving the corresponding document definition from a plurality of document definitions in accordance with an identifier in the received document.

8. A method according to claim 5, wherein the plurality of document definitions are provided in a local storage of the network device.

9. A method according to claim 1, wherein the step of parsing includes the step of parsing from the document an identifier corresponding to the service.

10. A method according to claim 9, wherein the step of parsing further includes the step of parsing from the document runtime parameters corresponding to the service.

11. A method according to claim 5, further including the step of:
    instantiating an object corresponding to the service in accordance with the parsed identifier.

12. A method according to claim 10, further including the step of:
    instantiating an object corresponding to the service in accordance with the parsed identifier and the parsed runtime parameters.

13. A method according to claim 1, wherein the network device comprises one of a router, a switch, and a hub.

14. A method according to claim 1, wherein the network device comprises a packet forwarding architecture.

15. A method according to claim 1, further comprising the step of preparing a response corresponding to the executed service.

16. A method according to claim 14, further comprising the step of forwarding the response to a remote requestor of the service.

17. A network device for locally performing a data forwarding service in response to a remote request, wherein the network device comprises a data forwarding device, the data forwarding device including a computer readable storage medium having program code stored thereon, the program code comprising:
    means for receiving at the network device a document written in accordance with a markup language and a corresponding document definition, wherein the document describes the data forwarding service by specifying a class of objects for the data forwarding service;
    means for parsing by the network device the received document in accordance with the corresponding document definitions, wherein the parsing determines at least one parameter describing the data forwarding service; and
    means for executing the data forwarding service on the network device upon completion of the parsing, in accordance with the parsed document, wherein the means for executing includes means for instantiating and launching the data forwarding service in the data forwarding device based on the class of objects for the data forwarding service, and wherein the data forwarding service configures a forwarding architecture in the network device operable to filter network traffic.

18. A network device according to claim 17, wherein the means for executing includes means for interfacing with hardware and software on the network device.

19. A network device according to claim 17, wherein the markup language is XML.

20. A network device according to claim 19, wherein the corresponding document definition is an XML DTD.

21. A network device according to claim 17, the program code further comprising:
    means for retrieving the corresponding document definition from a plurality of document definitions in accordance with an identifier in the received document.

22. A network device according to claim 21, wherein the plurality of document definitions are provided in a local storage of the network device.

23. A network device according to claim 19, further comprising:
    means for retrieving the corresponding document definition from a plurality of document definitions in accordance with an identifier in the received document.

24. A network device according to claim 21, wherein the plurality of document definitions are provided in a local storage of the network device.

25. A network device according to claim 17, wherein the means for parsing includes means for parsing from the document an identifier corresponding to the service.

26. A network device according to claim 25, wherein the means for parsing further includes means for parsing from the document runtime parameters corresponding to the service.

27. A network device according to claim 21, the program code further including:
    means for instantiating an object corresponding to the service in accordance with the parsed identifier.

28. The network device according to claim 26, the program code further including:
    means for instantiating an object corresponding to the service in accordance with the parsed identifier and the parsed runtime parameters.

29. A network device according to claim 17, wherein the network device comprises one of a router, a switch, and a hub.

30. A network device according to claim 17, wherein the network device comprises a packet forwarding architecture.

31. A network device according to claim 17, the program code further comprising means for preparing a response corresponding to the executed service.

32. A network device according to claim 30, the program code further comprising means for forwarding the response to a remote requestor of the service.

33. A network device for locally performing a data forwarding service in accordance with a received document written in a document markup language, wherein the network device comprises a data forwarding device, the data forwarding device including a computer readable storage medium having program code stored thereon, the program code comprising:
    a parser that is adapted to parse the received document in accordance with a document definition to obtain an identifier of the service, wherein the parsing determines at least one parameter describing the data forwarding service by specifying a class of objects for the data forwarding service; and
    a service launcher that is adapted to launch the data forwarding service corresponding to the identifier parsed from the received document, wherein the service launcher instantiates and launches the data forwarding service in the data forwarding device upon completion of the parsing based on the class of objects for the data forwarding service, and wherein the data forwarding service configures a forwarding architecture in the network device operable to filter network traffic.

34. A network device according to claim 33, the program code further comprising:
    a network data transfer service that is adapted to communicate with remote devices for receiving the document.

35. A network device according to claim 34, wherein the network data transfer service comprises an HTTP server.

36. A network device according to claim 33, wherein the markup language is XML.

37. A network device according to claim 36, wherein the document definition is an XML DTD.

38. A network device according to claim 33, further comprising a document definition storage coupled to the parser that stores a plurality of document definitions, the parser being further adapted to select the document definition from the stored plurality of document definitions in accordance with a document definition identifier.

39. A network device according to claim 33, further comprising a services storage coupled to the service launcher that stores a plurality of services, the service launcher being further adapted to select the service from the stored plurality of services in accordance with the parsed identifier.

40. A network device according to claim 33, the program code further comprising an Oplet Runtime Environment, the service launcher being further adapted to launch the service under the Oplet Runtime Environment.

41. A network device according to claim 33, further comprising a packet forwarding switch fabric.

42. A network device according to claim 41, wherein the launched service causes changes in how packets are forwarded through the packet forwarding switch fabric.

43. A network device according to claim 41, wherein the launched service monitors performance indicators of how packets are forwarded through the packet forwarding switch fabric.

44. A network device according to claim 33, further comprising device APIs for interoperating with device hardware and software for executing the launched services.

45. A network device according to claim 40, further comprising device APIs for interoperating with device hardware and software for executing the launched services.

46. A network device according to claim 41, further comprising device APIs for interoperating with device hardware and software for executing the launched services.

47. A method for causing a network device to locally perform a data forwarding service, wherein the network device comprises a data forwarding device, comprising the steps of:

identifying the data forwarding service to be performed at a remote client computer;

preparing at the remote client computer a document written in a markup language in accordance with a document definition, the document including an identifier of the service, wherein the document describes the data forwarding service by specifying a class of objects for the data forwarding service;

transmitting the document to the network device;

identifying at the network device the document definition corresponding to the transmitted document;

parsing by the network device the transmitted document in accordance with the corresponding document definition, wherein the parsing determines the class of objects for the data forwarding service and at least one parameter describing the data forwarding service; and executing the data forwarding related service on the network device upon completion of the parsing, in accordance with the parsed document, wherein the executing includes instantiating and launching the data forwarding service on the data forwarding device based on the class of objects for the data forwarding service, and wherein the data forwarding service configures a forwarding architecture in the network device operable to filter network traffic.

48. A method according to claim 47, wherein the markup language is XML.

49. A method according to claim 48, wherein the corresponding document definition is an XML DTD.

\* \* \* \* \*